United States Patent

Broom

[15] 3,650,736

[45] Mar. 21, 1972

[54] METHOD OF MOLDING ELECTRODES

[72] Inventor: Robert F. Broom, Villa Park, Ill.

[73] Assignee: Amforge, Inc., Chicago, Ill.

[22] Filed: Sept. 9, 1968

[21] Appl. No.: 758,624

[52] U.S. Cl. ...........................75/200, 29/25.17, 75/211, 75/214, 75/222

[51] Int. Cl. .........................................................B22f 3/12

[58] Field of Search..................75/200, 208, 222, 214, 226, 75/201, 217; 29/25.17

[56] References Cited

UNITED STATES PATENTS

| | | | |
|---|---|---|---|
| 3,006,069 | 10/1961 | Rhoads | 29/473.1 |
| 3,071,463 | 1/1963 | Hausner | 75/213 X |
| 3,266,893 | 8/1966 | Duddy | 75/222 |
| 3,325,257 | 6/1967 | Ang | 75/200 X |
| 3,441,409 | 4/1969 | Burr | 75/214 X |
| 3,142,559 | 7/1964 | Ruf et al. | 75/208 |
| 3,226,263 | 12/1965 | Oswin | 75/222 |
| 3,290,124 | 12/1966 | Holtzclaw, Jr. | 75/208 |
| 3,351,486 | 11/1967 | Buescher et al. | 75/208 |
| 3,272,603 | 9/1966 | Larsen | 29/182.1 |

*Primary Examiner*—Benjamin R. Padgett
*Assistant Examiner*—B. H. Hunt
*Attorney*—Gary, Parker, Juettner, Pigott & Cullinan

[57] ABSTRACT

An improved method of molding electrodes for use in electrical discharge machining comprising mixing various powdered materials together along with a binder, molding the same under a low pressure, and thereafter sintering the molded compound at a temperature approximately equal to the melting point of that one of the powders having the lowest melting point.

18 Claims, No Drawings

METHOD OF MOLDING ELECTRODES

BRIEF SUMMARY OF THE INVENTION

Electrical discharge or spark erosion machining, hereinafter referred to as EDM machining, is a well known technique for machining certain types of components where because of their complex shape or because of the material from which they are made it would be extremely difficult to utilize other more conventional machining processes. Certain unusual metals are virtually impossible to machine by other more conventional processes and for that reason are produced by means of EDM machining. In many other instances the part must be machined to a complex shape and for that reason the most practical means of forming the part is often by means of EDM machining.

While many complex machining operations can be performed by numerical control machine tools, such equipment is extremely expensive, and in most cases only the largest companies can afford to own such machinery. Accordingly, there is a tremendous need for EDM equipment which is much less expensive. Moreover, in many instances EDM machining is the only practical means of forming the desired part. However, even the EDM machining operation is often considered unduly expensive, primarily because of the cost of the electrode members which have only a short life.

For example, a company may purchase a part in the form of an investment casting, and then remove 0.020 inch from the entire surface by means of an EDM operation. Such an operation might require a roughing electrode, a semifinishing electrode and a finishing electrode. The roughing electrode might be used in perhaps 7 or 8 machining operations, the semifinishing electrode would likely be used only once, and the finishing electrode might be used once or twice, it being understood of course that the electrodes wear during use and it is for this reason that their life is quite limited. Present commercially available electrodes are sufficiently expensive that in many instances the cost of the electrodes may be several times greater than the cost of the unfinished casting, and there is no question but that the major portion of the total cost of producing the finished part will often be the cost of the electrodes used in the EDM operation.

The primary reason that electrodes for EDM operations are quite expensive is because of the cost of producing them rather than the cost of the electrode material. For example, graphite electrodes are in common use, but such electrodes have to be machined, and in some instances the cost of machining the graphite electrode may not be a great deal less than it would cost to simply machine the final part by more conventional methods rather than use an EDM process. The expense of the electrode becomes particularly important of course if the electrode wear is such that it can be used only once. Of the various commonly used electrode materials, few if any of the high quality electrode materials permit manufacture of electrodes by an inexpensive casting process. Thus, most electrodes used in EDM machining are manufactured by one of two processes, either by machining, or by high pressure compaction powder metallurgy techniques. It is quite common to machine the electrodes, and obviously this is very expensive, particularly where the electrode has a complex shape.

It is well known to manufacture EDM electrodes by means of conventional powder metallurgy techniques. However, the cost of the tooling which is necessary for this process is so great that unless one is manufacturing an extremely large number of identical electrodes the cost of manufacture is quite high. When using powder metallurgy techniques, the cold metal powder is squeezed under very high pressure in a hardened tool steel die, the pressure applied being in excess of the yield strength of the metal powder so as to produce a mechanical locking of the irregularly shaped metal particles to one another. Thereafter, the compacted powder is sintered at a temperature below the melting point of the metal powder so as to produce diffusion bonding of the metal particles.

Because of the high pressure which is required for a powder metallurgy compaction, it is necessary that the metal tooling or die by sufficiently strong to withstand such pressures, meaning that the mold must normally be made to withstand pressures of 100,000 p.s.i. or more. For this reason, conventional metal, wood or plastic patterns of the type normally provided cannot be used, and special metal tooling must be made. Such metal tooling is extremely expensive, and there is the additional consideration that it often takes a long time to have such tooling produced.

It is therefore an object of the present invention to provide a process for molding electrodes under low pressure thereby eliminating the need for machining and also the need for providing special tooling as required for high pressure compaction powder metallurgy processes. In accordance with the process of the present invention it is possible to work with inexpensive conventional patterns made of wood, plastic or metal, and to work from such patterns or from the part itself in making an inexpensive mold for molding the electrode members, for example, a vulcanized rubber mold.

The foregoing and other objects and advantages of the invention will be apparent from the following description of a preferred embodiment thereof. Now, in order to acquaint those skilled in the art with the manner of practicing my invention, I shall describe certain preferred embodiments of the invention.

DETAILED DESCRIPTION OF THE INVENTION

The present invention involves a molding process which requires only very low pressure as compared to powder metallurgy processes, and also generally requires lower temperatures than processes of the latter type. The present molding process basically involves mixing at least two powders together, which two powders have different melting point, and then combining the powders with a binder material and placing the resulting mixture in a mold having the desired electrode shape. Pressure is preferably applied to the material while the same is in the mold, but the primary purpose in applying the pressure is simply to remove all air bubbles and to assure that the material accurately conforms to the shape of the mold. Consequently, very low pressures, for example, a pressure of 50 p.s.i. or less, can be used, with the result that the expensive metal tooling such as a hardened tool steel die required for high pressure compaction powder metallurgy processes is completely eliminated.

When the binder material has hardened, the molded electrode member is removed from the mold and preferably is allowed to dry at room temperature. It is then placed in an oven where it is sintered for about 30 minutes in an inert atmosphere at a temperature approximately equal to the melting point of that one of the two powders which has the lower melting point. Accordingly, the powder particles having the lower melting point will flow along the voids defined between the higher melting point particles. The latter particles or aggregate, being subjected only to a very low pressure and having a melting point substantially higher than the sintering temperature, will remain substantially undeformed, thereby affording exceptionally good dimensional stability with the molding process of the present invention. In accordance with a preferred embodiment, a substantially larger amount of the higher melting point powder or aggregate material is used.

By way of example, let it be assumed that the two powders selected for the electrode are brass and iron, and that the mixture is to comprise 66⅔ percent iron powder by weight and 33⅓ percent brass powder by weight. The criteria in selecting the two powders is that the one having the lower melting point should have good electrical properties for purposes of EDM machining, whereas the other powder having the higher melting point should constitute a structurally acceptable material which exhibits a reasonable amount of resistance to wear. In the foregoing example, the brass has a melting point of approximately 1,650° F., whereas the iron powder has a melting point of approximately 2,900° F. The brass is selected because it has relatively good electrical properties, whereas the iron powder is selected because it has acceptable wear properties, is relatively inexpensive, and has a melting point substantially higher than the brass.

Continuing with the forgoing example, the iron powder and brass powder are mixed together dry in the above-described proportions, and then a binder such as colloidal silica is added in the amount of 10 percent of the total dry aggregate weight. Of course, larger amounts of binder material can be used, since any excess binder will be squeezed out during the molding process and thereby eliminated. The mixture of the two metal powders and the colloidal silica binder is then placed in a mold, for example, a vulcanized rubber mold, and the mixture in the mold is subjected to a low pressure which normally need not exceed 50 p.s.i., the pressure serving to squeeze out all air bubbles from the mixture and cause the same to assume the shape of the mold. Of course, higher pressures can be used, but the important thing is that they are not normally required, and in any event the pressure used in accordance with the present invention should never approach the yield strength of the powders being molded.

Because of the colloidal silica binder, which is a cold setting binder, the material in the mold will harden. It can then be removed, allowed to dry, and then placed in an oven for a sintering operation. In the example being described, the powder having the lower melting point is the brass which has a melting point of 1,650° F. Accordingly, the molded electrode member, held together by the colloidal silica which acts as a temporary binder, is allowed to dry at room temperature and is then heated in the oven to a temperature approximately equal to the melting point of the brass, i.e., to approximately 1,650° F.

It is important to note that the sintering temperature is sufficiently below the 2,900° F. melting point of the iron powder so that the iron powders are not diffused with one another as in high pressure compaction powder metallurgy processes. On the other hand, the brass powders are converted to a liquid phase, and thus the brass is caused to flow through the iron network and thereby form a continuous brass network having good electrical properties for EDM machining operations. It is the electrical character of the final product as produced by the continuous brass network which is of major importance, but it will further be understood that the continuous brass network will act as a binder after the sintering operation, and thus the binding action of the colloidal silica binder is in fact no longer necessary. As a result of the brass network, the molded electrode member will be substantially stronger after the sintering operation.

It will be understood from the foregoing that the purpose of the sintering operation is to melt the brass powder and cause it to flow along the voids defined between the iron particles thereby producing a continuous electrical network of brass. The iron powder will provide dimensional stability so that little if any shrinkage of the molded product will occur during the sintering operation, and while the dimensional stability afforded by the higher melting point iron powders and the resultant lack of shrinkage of the part will mean that the brass material will not completely fill the voids which are present, it will be understood that the presence of such voids does not present a problem since high strength is not a requirement for the final electrode product. The purpose of the colloidal silica is to act as a temporary binder and hold the molded electrode member in its desired shape until the brass is converted to its liquid phase and caused to form a continuous network.

Of course, if the sintering operation could be carried out without removing the molded electrode material from the mold, then the colloidal silica binder would not be necessary, but any such procedure would require the use of special molds which could withstand the high sintering temperatures, or the use of expendable molds. Consequently, the preferred procedure is to use a binder material, remove the molded electrode member from the mold, allow the electrode member to dry, and then perform the sintering operation on the molded electrode.

It should be noted that the heating step of the present invention may be carried out in various ways other than as specifically described herein. In other words, any suitable means for inducing a thermal change may be used. For example, a dielectric oven may be used whereby the electrically conductive material in the molded part will be caused to react to a voltage field thereby producing local heating of the electrically conductive material without causing heating of the entire molded part. Such a heating process can be facilitated by adding a material such as urea resin to the electrically conductive material such as brass, since the resin will react to the voltage field causing the brass to heat and melt.

It will be understood that because the brass and iron powders are thoroughly mixed together before the sintering operation, the present process differs from one where a vessel is filled with powdered material and then a molten material is poured into the vessel to fill the voids. In the latter situation, the particles must be relatively large in size so that the voids are large enough to permit the molten material to flow through the entire network and fill all the voids. However, in accordance with a preferred embodiment of the present invention, the two powders are mixed together before the sintering operation.

Thus, assuming brass and iron powders are used, the liquid brass does not in fact have to flow through the entire network, since the brass particles are already in place in the voids and it is only necessary that the brass flow a very short distance so as to form an electrical network and coat the iron particles. Accordingly, because the liquid phase material such as the brass is already in position before the heating cycles begins, the primary aggregate material, e.g., the iron powders, can be of a relative fine size where desired. In other words, there are no appreciable limitations relative to particle size when practicing the present invention.

It is interesting to note that the colloidal silica binder has been found not to significantly impair the electrical characteristics of the molded electrode member. One might think that the presence of a binder such as colloidal silica in the electrode member would impair the electrical characteristics of the electrode when used in an EDM process, since the colloidal silica is a non-conductive material. However, I have found that such is not the case. In attempting to explain such a result, one reason may be due to the fact that the silica is present only in small quantities. More specifically, it is believed that the silica does not coat the iron particles but is present only where the metal particles are joined to one another, so that it covers only a small area compared to the size of the metal particles themselves and compared to the area affected by the spark during an EDM operation.

In the example described hereinabove, brass powder was selected as the lower melting point powder in part because of its electrical properties, and iron powder was selected as the higher melting point primary material in part because of it structural or wear properties and because it is relatively inexpensive. The present invention is not limited to the use of particular powder materials, and various other powders and the like may be utilized. However, it will be clear that at least two different powder materials are mixed together, one having a lower melting point than the other, and the one having the lower melting point forms a generally continuous network in the final product and must have acceptable electrical properties.

If we refer to the lower melting point material as the electrical material, then it can be said that brass has been found to be well suited for use as the electrical material in accordance with the present invention. However, various other materials may also be used such as aluminum, silver, gold, silver solder, copper and electrical solders. Certain materials such as carbon have reasonably good electrical properties but are believed less desirable for use as the electrical material in the present molding process because they have unusually high melting points, e.g., 4,000° F. for carbon.

Beyond the foregoing, any number of other metals having acceptable electrical properties could be used, although it is preferred that the melting point of the electrical material not be substantially in excess of 2,500° F. Materials with higher melting points could be used as the electrical material, but then the problem is presented relative to providing a furnace or oven which is capable of heating molded electrode members up to the melting point of the electrical material. The electrical component may be made of metal powder having a melting point substantially lower than the 1,650° F. melting point of brass, providing of course that the material has acceptable electrical properties. However, some difficulty may be encountered in tuning the EDM powder supply to obtain optimum operation during an EDM machining process if the melting point of the electrical network in the electrode is unduly low.

As for the basic component or aggregate which has a melting point well above the sintering temperature used in the present process, iron powder was described as one example. Iron powder exhibits acceptable wear properties for many applications, and it has the advantage of being a relatively inexpensive material. Any number of other materials can be used as the basic powder component in accordance with the present invention, it being preferable to use metal powders which have a high melting point and which are not too expensive. It is preferred that the melting point of the primary powder material be at least approximately 2,500° F. Other materials which may be used in addition to iron are tungsten, nickel and molybdenum.

Although we have discussed hereinabove only metal powders for the basic electrode aggregate material, it is worth noting that the iron powder works quite well despite the fact that it has very poor electrical properties. Thus, because of the continuous network formed by the electrical material such as the brass, it is believed possible that even nonmetallic materials can be used as the basic component to be mixed with the electrical material. In other words, certain nonmetallic materials which have very high melting points and extraordinary wear properties could be used with the present process, even though many such materials could not be used in conventional powder metallurgy processes because the latter process requires heating the powder to a temperature sufficient to produce diffusion bonding. In the instant process, the sintering temperature is determined by the lower melting point of the electrical material rather than the higher melting point of the basic or primary electrode material because the purpose is not to diffuse together the particles of the basic material.

As for the relative amounts of the electrical material and the basic aggregate material, in the above example I described a mixture of 33-⅓ percent brass powder by weight and 66⅔ percent iron powder by weight. Normally, in practicing the present invention, it will be desirable to provide substantially more of the aggregate or higher melting point material as compared with the amount of the lower melting point electrical material. However, such relative amounts can vary substantially, it being preferred to utilize 50 to 90 percent by weight of the higher melting point powder and 10 to 50 percent by weight of the lower melting point powder. The amount of pressure applied to the materials when in the mold is not at all critical, since as described earlier herein the pressure is primarily only to squeeze out the air bubbles and cause the material to assume the shape of the mold. Such purposes can normally be accomplished by using pressures not in excess of 50 p.s.i. Higher pressures may be used if desired, but unlike high pressure compaction powder metallurgy processes the pressure should always be kept substantially below the yield strength of the powders.

The temporary binder material, such as the colloidal silica described by way of example hereinabove, is preferably a cold setting binder which will harden at room temperature, and it must not fully coat the particles of the aggregate higher melting point material, or if it does coat such particles it must not substantially impair the electrical characteristics of the final molded electrode member. It is believed that the colloidal silica binder mechanically locks the higher melting point particles such as the iron particles together while still leaving substantial voids between such particles. During the subsequent sintering operation the lower melting point electrical material flows along such voids to produce the continuous electrical network. Clearly, the binder must not itself fill all the voids, and it is further believed preferable that the binder not coat the particles which it binds together.

The colloidal silica binder is more or less liquid in form, and after the two metal powders are mixed dry and the colloidal silica added thereto, there results a mixture which can be referred to as a plastic mass having a consistency generally similar to that of a caulking compound. The resulting plastic mass is tamped into the mold, or it can be extruded into the mold from a prefill chamber.

In the application of the present invention for the manufacture of electrode members, one can begin either with a conventional pattern, or with a casting or machined part which is to be reproduced. For example, if there is available a female pattern member which has the usual shrinkage built into it, it is then possible to produce directly from the pattern an electrode mold, and the mold may then be used to produce any desired number of electrodes in the manner described hereinabove. The electrode, which in effect is a three-dimensional cutting tool, may then be used for any desired purpose, such as for machining female die members which in turn can be used as inserts in a forging press for manufacturing forged parts having the shape of the electrode. The pattern may be made of wood, plastic or metal, and the electrode mold may be made directly from the pattern.

The mold can be made of various materials, and I have pointed out above that it need not be made to withstand high pressures. One preferred material for the mold is vulcanized rubber. Other mold materials such as metals, plasters and plastics may be used in conjunction with the present invention, but rubber tooling has a number of advantages, one being that it is flexible and therefore can be deformed somewhat to facilitate removal of a molded compound from the mold. It is generally somewhat easier to work with rubber tooling when producing a molded component which does not have substantial strength, and this is true of the molded compounds made in accordance with the present invention particularly prior to the sintering operation.

When working directly from the part which is to be reproduced, and where the process of the present invention is being used to produce a forging die for the forging of such a part, then it is necessary to expand the part in one or more reversing processes in order to build in the usual shrinkage. For example, the part can be cast or molded in expansion plater and reversed a few times so as to enlarge it. Then, the expanded form may be used by vulcanizing a rubber mold directly around the form, thereby producing a female rubber mold having the desired shape with the shrinkage built in. Any desired number of electrode members may then be molded in the rubber mold in accordance with the process of the present invention, and thereafter such electrodes may be used in EDM operations to machine female dies which may then be used in the forging of the final part. Of course, innumerable other applications are possible, it being understood that the process of the present invention is not only much less expensive than high pressure powder metallurgy techniques, while affording improved dimensional stability, but in addition, because of the low pressures required, it is not restricted to the manufacture of relatively small parts as is true with processes requiring very high pressures.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. A method of molding an electrodischarge machining electrode member from a plurality of powdered materials, said method comprising the steps of mixing at least two powdered materials together, a first one of said powdered materials having acceptable electrical characteristics and having a first melting point, and a second one of said powdered materials having a second melting point substantially above said first melting point, combining said powdered materials with a binder to form a resulting mixture, placing said mixture in a mold, applying pressure to said mixture in said mold so as to form a molded electrode member, said pressure being substantially below the yield strength of either of said powdered materials, allowing said mixture to harden in said mold so as to form a molded electrode member, removing said molded electrode member from said mold, and thereafter heating said molded electrode member to a temperature at least approximately equal to said first melting point but sufficiently below said second melting point as to avoid diffusion of the powders of said second powdered material with one another and thereby avoid any substantial shrinkage so as to maintain the dimensional stability of said molded electrode member, said first and second powdered materials being selected so as to have sufficiently low solid solubility in each other that during the foregoing heating step the first powdered material will not be substantially diffused into the second powdered material but instead will flow along the voids defined between the particles of said second powdered material so as to form a continuous electrical network comprised of said first material.

2. The invention of claim 1 wherein said pressure does not exceed approximately 50 p.s.i.

3. The invention of claim 1 where each of said two powdered materials is a metal powder.

4. The invention of claim 1 where said binder is a cold-setting binder.

5. The invention of claim 4 where said binder comprises colloidal silica.

6. The invention of claim 1 where said mold is made of rubber.

7. The invention of claim 1 where said heating is carried on for at least approximately 30 minutes in an inert atmosphere.

8. The invention of claim 1 where the mixture of said two powdered materials comprises approximately 20 to 40 percent by weight of said first powdered material and 60 to 80 percent by weight of said second powdered material.

9. The invention of claim 1 where the ratio by weight of said second powdered material to said first powdered material is approximately 2 to 1.

10. The invention of claim 1 where said first powdered material comprises a metal having a melting point below 2,500° F.

11. The invention of claim 10 where said first powdered material comprises brass powder.

12. The invention of claim 1 where said second powdered material has a melting point above 2,500° F.

13. The invention of claim 1 where said second powdered material is taken from the group consisting of iron, tungsten, nickel and molybdenum.

14. A method of molding an electrodischarge machining electrode member from a plurality of powdered metals, said method comprising the steps of mixing at least two powdered metals together, a first one of said powdered metals having acceptable electrical characteristics and having a first melting point, and a second one of said powdered metals having a second melting point substantially above said first melting point, combining said powdered metals with a cold-setting binder to form a resulting mixture, placing said mixture in a mold and applying pressure thereto, said pressure being substantially below the yield strength of either of said powdered metals, allowing said mixture to harden in said mold so as to form a molded electrode member, and removing said molded electrode member from said mold and heating the same to a temperature at least approximately equal to said first melting point but sufficiently below said second melting point as to avoid diffusion of the powders of said second powdered material with one another and thereby avoid any substantial shrinkage so as to maintain the dimensional stability of said molded electrode member, said first and second powdered metals being selected so as to have sufficiently low solid solubility in each other that during the foregoing heating step the first powdered metal will not be substantially diffused into the second powdered metal but instead will flow along the voids defined between the particles of said second powdered metal so as to form a continuous electrical network comprised of said first metal.

15. The invention of claim 14 where said pressure does not exceed approximately 50 p.s.i.

16. The invention of claim 14 where said binder comprises colloidal silica.

17. The invention of claim 14 where the mixture of said two powdered metals comprises approximately 20 to 40 percent by weight of said first powdered metal and 60 to 80 percent by weight of said second powdered metal.

18. The invention of claim 14 where said first powdered metal has a melting point substantially below 2,500° F. and said second powdered metal has a melting point substantially above 2,500° F.

* * * * *